(12) United States Patent
Gargi et al.

(10) Patent No.: US 8,510,252 B1
(45) Date of Patent: Aug. 13, 2013

(54) CLASSIFICATION OF INAPPROPRIATE VIDEO CONTENT USING MULTI-SCALE FEATURES

(75) Inventors: Ullas Gargi, San Jose, CA (US); Jay Yagnik, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 1270 days.

(21) Appl. No.: 12/248,780

(22) Filed: Oct. 9, 2008

Related U.S. Application Data

(60) Provisional application No. 61/012,216, filed on Dec. 7, 2007.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 2002/0028021 A1* | 3/2002 | Foote et al. ................... | 382/224 |
| 2004/0231498 A1 | 11/2004 | Li et al. | |
| 2005/0002561 A1 | 1/2005 | Monachino et al. | |
| 2005/0157926 A1 | 7/2005 | Moravec et al. | |
| 2006/0068806 A1* | 3/2006 | Nam et al. ................. | 455/452.2 |
| 2007/0286499 A1 | 12/2007 | Freiburg et al. | |
| 2008/0109730 A1 | 5/2008 | Coffman et al. | |
| 2008/0126281 A1 | 5/2008 | Kisacanin et al. | |
| 2009/0113278 A1* | 4/2009 | Denoue et al. ................. | 715/201 |

OTHER PUBLICATIONS

Fan et al. "Model-Based Video Classification toward Hierarchical Representation, Indexing and Access", Multimedia Tools and Applications, 17, 97-120, 2002.*
Tao Li et al, *A Survey on Wavelet Applications in Data Mining*, SIGKDD Explorations, Dec. 2002, pp. 49-68, vol. 4, Issue 2.
*MCI-B: Installing and Getting Familiar with Scilab; II—A first step in multiscale analysis*, [online] retrieved from the internet on Oct. 16, 2007, pp. 1-17, Retrieved from the URL:<http://hmf.enseeiht.fr/travaux/CD0506/mci/reports/ibfs/html/p_multi.htm>.
Ulges, A., et al., "Identifying Relevant Frames in Weakly Labeled Videos for Training Concept Detectors," Conference on Image and Video Retrieval, Proceedings of the 2008 International conference on content-based image and video retrieval, 2008, pp. 9-16.

* cited by examiner

Primary Examiner — Li-Wu Chang
(74) Attorney, Agent, or Firm — Fenwick & West LLP

(57) ABSTRACT

A method, a system and a computer program product generate a statistical classification model used by a computer system to determine whether a video contains content in a particular class, such as inappropriate content.

60 Claims, 11 Drawing Sheets

| Video ID | FeatureName | Feature Time Point | Feature Value |
|---|---|---|---|
| | FeatureName | Feature Time Point | Feature Value |
| | ... | ... | ... |
| | FeatureName | Feature Time Point | Feature Value |

Fig. 2a

| Video ID | Class | FeatureName | Feature Time Point | Feature Value |
|---|---|---|---|---|
| | | FeatureName | Feature Time Point | Feature Value |
| | | ... | ... | ... |
| | | FeatureName | Feature Time Point | Feature Value |

Fig. 2b

CLASSIFICATION OF INAPPROPRIATE VIDEO CONTENT USING MULTI-SCALE FEATURES

RELATED APPLICATIONS

This Application claims the benefit of Provisional Application No. 61/012,216 filed Dec. 7, 2007, the entire disclosure of which is hereby incorporated by reference, in its entirety.

TECHNICAL FIELD

The disclosed embodiments relate generally to the video classifiers for classifying videos according to whether they contain inappropriate content, and more particularly to the generation of multi-scale features to learn features with high discriminative value for classifying videos according to whether they contain inappropriate content.

BACKGROUND OF THE INVENTION

Classifiers are statistical models, typically implemented as computer programs executed on computer systems, used to classify real world events based on a set of features of a real world event. A real world event is an instance of any entity or event in the real world. An instance of a person and an instance of a hockey game are both real world events. However, real world events can be works of imagination, such as book of fiction, a fake news story, an abstract painting, or a computer-generated digital image. Each of these events are still instances of their respective types.

Videos are one type of real world event that can be classified based on a set of features. Videos have various features, which can be based on attributes or elements of the video. An attribute is a numerical or qualitative aspect of a video, for example, a video can have attributes such as an average number of shots, average pitch, an average luminance, a texture parameter, or the like. An element refers to a sub-part of a video. Elements of a video could include a frame, a sequence of frames or a sound bite.

In video classification, statistical models are generated which reflect the probability that a video belongs to class of videos based on its set of features. Videos may be labeled according to any system which creates distinct classes of videos that can be characterized by a set of features. Classes can be based on the type of event depicted within the video, a person in one or more frames of the video, the genre of the video or style of the video. Classes may also be based on a type of content contained in the video. For instance, videos may be classified as to whether they contain inappropriate content such as adult content, violent content or hateful content based on features within the videos that characterize this type of content. The statistical models generated in classification identify and apply the features with the strongest discriminative value in the differential determination of classes of events. The discriminative value of a feature is a function of a feature's association with a class and the ability to discriminate members of the class based on the feature.

Features used in video classification are time series features, meaning they are generated and evaluated over a series of time points either sampled from the video or determined continuously for the video. The manipulation and comparison of time series feature data creates several challenges in the classification of videos and other time series events. One problem associated with the representation of features over a series of time points is that features which have strong discriminative value for a class can be found at multiple different time scales of a video or other times-series event. For instance, some features with a strong discriminative value may occur for only a small time interval or scale (e.g. at the millisecond scale) and other features with strong discriminative value may occur over a larger time interval or scale (e.g. at a scale of minutes or the entire duration of time series event). For instance, a maximum value over a small interval of time (e.g. a high sound pitch caused by a scream in a horror movie) may have equal discriminatory value as an average feature value taken over several minutes of a video (e.g. the number of different shots in a video showing a sporting event).

Inappropriate videos are videos which contain content that is inappropriate for public viewing, for example at a video website, due to objectionable or unacceptable content. Inappropriate content includes but is not limited to: hate speech, violence and pornography. Generally, the provider of the videos (e.g. an administrator of a video website) establishes a set of criteria or guidelines for determining what types of videos and subject matter are deemed inappropriate and prohibiting these videos. Based on this set of criteria, the provider selects a set of videos to train a statistical classifier to recognize inappropriate content. This set of criteria corresponds to features in the video that distinguish the videos as containing inappropriate content. For instance, the provider's specification of punching or kicking as violent acts may correspond to motion models of the same which distinguish the video as inappropriate content.

The order of the time series values over time creates additional problems in inappropriate video classification. Time series features are typically represented as an ordered vector of values corresponding to features over time or space. While order is important in determining time series features, often features with high discriminatory value for a label can occur in different portions of the video. For instance, inappropriate or adult content is often spliced into videos at different time points making it more difficult to detect using time series features that are bound to a temporal model.

Other problems in classifying inappropriate videos based on time series features are caused by periodicity and sparseness of the time series features. Certain features may have discriminative value based on their periodicity or recurrence over semi-regular time intervals. For instance, inappropriate videos containing hate speech may only the periodic and re-current use of language that is distinctive of hate speech, which acts as a recurrent and periodic event that can be used to discriminate these types of videos from other types of videos. Other time series features may be sparse, meaning that the occurrence of the time series feature is sporadic over the video or other time series event and/or occurs over a brief interval of time.

SUMMARY

The described embodiments provide a method, system and computer program product for determining that a video contains content of a particular class, such as inappropriate content.

One aspect provides a method of determining that a video contains inappropriate content. A set of time-series features associated with a video is identified. A set of multi-scale features associated with the video based on the set of time-series features associated with the video is determined, wherein each multi-scale feature is associated with a scale representing a spatial or temporal portion of the video and at least some of the scales correspond to a spatial or temporal portion of the video containing inappropriate content. It is determined that the video contains inappropriate content based on the set of multi-scale features.

In another aspect, the described embodiments provide a computer system for determining that a video contains inappropriate content. The system comprises a time-series feature generation module adapted to identify a set of time-series features associated with a video. The system further comprises a multi-scale feature generation module adapted to determine a set of multi-scale features associated with the video based on the set of time-series features associated with the video, wherein each multi-scale feature is associated with a scale representing a spatial or temporal portion of the video and at least some of the scales correspond to a spatial or temporal portion of the video containing inappropriate content. The system further comprises an inappropriate video classification module adapted to determining that the video contains inappropriate content based on the set of multi-scale features.

Another aspect is embodied as a computer-readable storage medium on which is encoded computer program code for determining that a video contains inappropriate content according to the method described above.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2a illustrates the storage of Video Feature Data 211 generated from unlabelled video data in a Video Database 111 according to one embodiment FIG. 2b illustrates the storage of Video Feature Data 211 generated from labeled video data in the Video Corpus Database 121 according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

Figure 1:
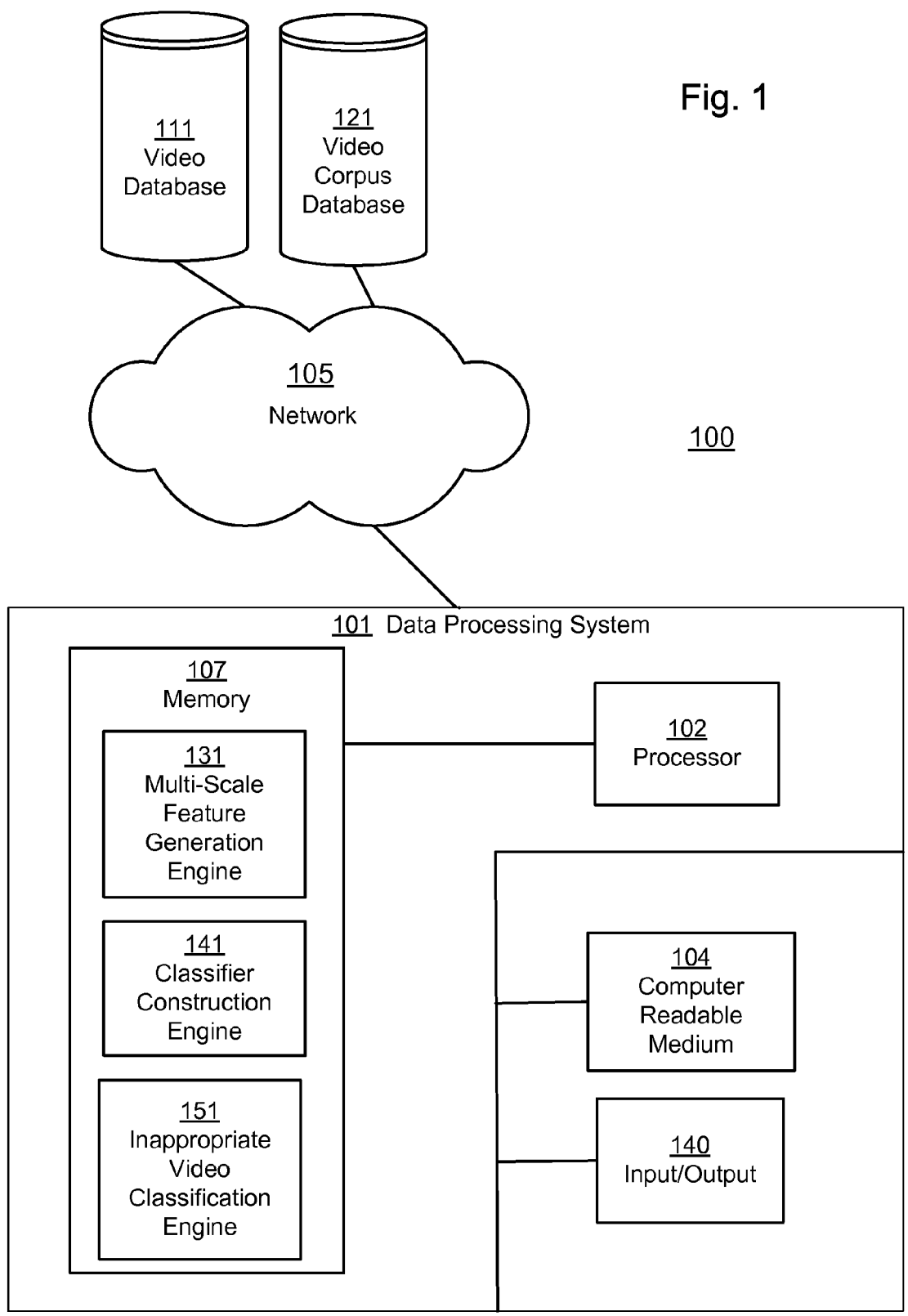
FIG. 1 shows a system environment 100 for an inappropriate video classification system according to one embodiment.

FIG. 1 shows a system environment 100 adapted to support one embodiment of a data processing system 101. FIG. 1 shows components used to generate multi-scale features, generate time series events classifiers and classify time series events. The system environment 100 includes a Network 105, through which a Video Database 111, and Video Corpus Database 121 are accessed by a data processing system 101. The Video Database 111 stores unlabelled videos. The Video Corpus Database 121 stores videos that have been labeled according to a set of classes. For purposes of clarity, the Video Corpus Database 121 and the Video Database 111 are discussed herein as single databases. In some embodiments, both the Video Database 111 and the Video Corpus Database 121 can be comprised of multiple separate databases.

FIG. 1 shows component engines used to generate and apply classifiers to video data. The data processing system 101 includes a Multi-Scale Feature Generation Engine 131, Classifier Construction Engine 141 and an Inappropriate Video Classification Engine 151. Each of the foregoing are implemented, in one embodiment, as software modules (or programs) stored in memory 107 and executed by a processor 102.

FIG. 1 shows that the data processing system 101 includes a memory 107 and one or more processors 102. The memory 107 includes the Multi-Scale Feature Generation Engine 131, Inappropriate Video Classification Engine 151 and the Classifier Construction Engine 141 each of which is preferably implemented as instructions stored in memory 107 and executable by the processor 102.

FIG. 1 also includes a computer readable storage medium 104 for storing, for example, at least one of the Inappropriate Video Classification Engine 151 and the Classifier Construction Engine 141. FIG. 1 also includes one or more input/output devices 140 that allow data to be input and output to and from the data processing system 101. It will be understood that embodiments of the data processing system 101 also include standard software and hardware components such as operating systems and the like and further include standard hardware components (e.g. network interfaces, storage devices, etc.) not shown in the figure for clarity of example.

The Multi-Scale Feature Generation Engine 131 operates to generate time series features from videos and store the time series features. The Multi-Scale Feature Generation Engine 131 further operates to generate multi-scale features from the stored time series features.

The Classifier Construction Engine 141 operates to select training sets of multi-scale feature data associated with labeled video data from the Video Corpus Database 121, and generate classifiers based on the selected training sets. The Classifier Construction Engine 141 further operates to generate scores representative of the accuracy of a classification model by generating a plurality of classifiers according to the classification model. The Classifier Construction Engine 141 is adapted to communicate with Video Corpus Database 121 through the network 105.

The Inappropriate Video Classification Engine 151 operates to classify video data as to whether it contains inappropriate content, consistent with the criteria and guidelines established by the system provider to distinguish content for which unrestricted public viewing is prohibited. The Inappropriate Video Classification Engine 151 is adapted to communicate with the Classifier Construction Engine to 141 receive classifiers. The Inappropriate Video Classification Engine 151 is also adapted to communicate with the Video Database 111 and the Video Corpus Database 121.

According to the embodiment of the present invention, the Classifier Construction Engine 141 and the Inappropriate Video Classification Engine 151 can operate on the unlabeled and labeled video data in the Video Corpus Database 121 and the Video Database 111 in different orders than described above.

It should also be appreciated that in practice at least some of the components of the data processing system 101 will be distributed over multiple computers, communicating over a network. For example, either or both of the Inappropriate Video Classification Engine 151 and the Classifier Construction Engine 141 may be deployed over multiple computer servers. For convenience of explanation, however, the components of the data processing system 101 are discussed as though they were implemented on a single computer.

In another embodiment, some or all of the Video Corpus Database 121 and the Video Databases 111 are located on the data processing system 101 instead of being coupled to the data processing system 101 by a network 105. For example, the Inappropriate Video Classification Engine 151 may classify videos from the Video Database 111 that are a part of or associated with the data processing system 101.

FIG. 2a illustrates the storage of time series video data in the Video Database 111 according to one embodiment. Videos are represented using Video IDs 205 and stored as tuples in the Video Database 111. A tuple comprises a Video ID 205 and one or more sets of Time Series Features 211. Each Time Series Feature 211 includes a Feature Name 207, a Feature Value 209 and a Feature Time Point 208.

The Video ID 205 can be any kind of unique identifier that uniquely identifies (e.g., as a primary key in the Video Corpus Database 121) a video such as a random alphanumeric string, bit string, or the like, or a combination of data associated with the video such as the name of the video, or other information specific to the Video.

Time Series Features 211 are sets of features that are calculated or extracted at different time points in the video (or other underlying data) to represent or describe videos as a set of values over time. Each Time Series Feature 211 represents a qualitative attribute or quantitative attribute of the video taken at a time point or interval within the video. A Time Series Feature 211 may represent an element of a video at frames taken from different time points or time intervals within a video. Information from individual frames or shots may are processed to generate features representing visual aspects of each frame or shot such as color histograms, motion vectors and/or the audio aspects such as the MelFrequency Cepstral Coefficient (MFCC) features.

The Feature Name 207 is a unique identifier used to denote the equation or value that is captured in the Feature Value 209. The Feature Name 207 may store a set of strings corresponding to the names of the different features such as luminosity, percentage of grey pixels, pitch, number of shots detected, etc. The Feature Name 207 may also be represented as any categorical variable or as a set of unique integers used to represent the features.

Each Feature Name 207 in the Time Series Feature 211 corresponds with a Feature Value 209. A Feature Value 209 is the value calculated using the feature denoted by the Feature Name 207. According to the type of Time Series Feature 211, the Feature Value 209 may be categorical, textual or numeric.

The Feature Name 207 and Feature Value 209 are associated with a Feature Time Point 208. The Feature Time Point 208 denotes a time point or multiple time points specifying a time point or interval in the video from which the Feature Value 209 is calculated. Feature Time Points 208 can be represented using a variety of methods such as a number of seconds into the video, a percentage value representing a portion of time elapsed, or values specifying the start or stop points of the Video. For Videos which occur over space the Feature Time Points 208 may be represented as spatial coordinates, integers representing ordered positions, etc. The time interval for a Time Series Feature 211 corresponds to a space or time interval from the Video. A time interval may be correspond to a fraction of a second or small number of frames of the video, a shot within the video or the entire duration of the video.

FIG. 2b illustrates the storage of Time Series Features 211 in the Video Corpus Database 121. Each video is represented by a tuple in a Video Corpus Database 121. A tuple comprises a Video ID 205, a Class 206 and one or more sets of Time Series Features 209. Each Time Series Feature includes a Feature Name 207, a Feature Value 209 and a Feature Time Point 208.

A Class 206 is used to represent a class or category of video. A class is any group of real world events having shared characteristics such as features. A category is a type of class that marks a natural division between different types of things. Videos in the Video Corpus Database 121 are assigned one or more Class 206 fields. Class 206 fields may be assigned manually or assigned computationally. Manual curation of a corpus refers to the assignment of classes or categories to events based on human discretion. Computational assignment of classes to videos refers to the use of machine learning approaches to generate classification values indicative that a video belongs to a Class 206. In one embodiment, the Class 206 field is assigned by the Inappropriate Video Classification Engine 151.

For inappropriate video classification the Class 206 fields represent whether the Videos in the Video Corpus Database 121 contain inappropriate content for which unrestricted public viewing is prohibited. Inappropriate content as used herein, refers to content that is not appropriate for viewing by all potential viewers, as determined by the system provider using a set of criteria and/or guidelines. Inappropriate content can include but is not limited to violent content, adult content and hateful content. Consequently, the system provider prohibits unrestricted public access of videos based on the set of criteria and/or guidelines provided. For instance, the system provider may decide that inappropriate content such as violent content may be appropriate for adults who desire to view it, but that violent content may be deemed inappropriate for children to view or undesirable for other adults to view. In this case, the system provider prohibits unrestricted access of violent videos by providing a set of criteria for establishing what is considered "violent" and as necessary select sample Videos for training and classification.

In some embodiments, the Class 206 field represents whether the Video contains hateful content. For example, the system provider may provide a guideline that hateful content is any content which has the effect to degrade, intimidate, or incite violence or prejudicial action against a person or group of people based on their race, gender, age, ethnicity, nationality, religion, sexual orientation, gender identity, disability, language ability, moral or political views, socioeconomic class, occupation or appearance (such as height, weight, and hair color), mental capacity and any other distinction. In some embodiments, the Class 206 represents whether the Video contains adult content. For example, the system provider may provide a guideline that adult content is any content that depicts nudity and/or sexual behavior. In some embodiments, the Class 206 represents whether the Video contains violent content. For example, the system provider may provide a guideline that violent content is any content that depicts the use of physical force to damage, injure, or kill a human or an animal.

Figure 3A:
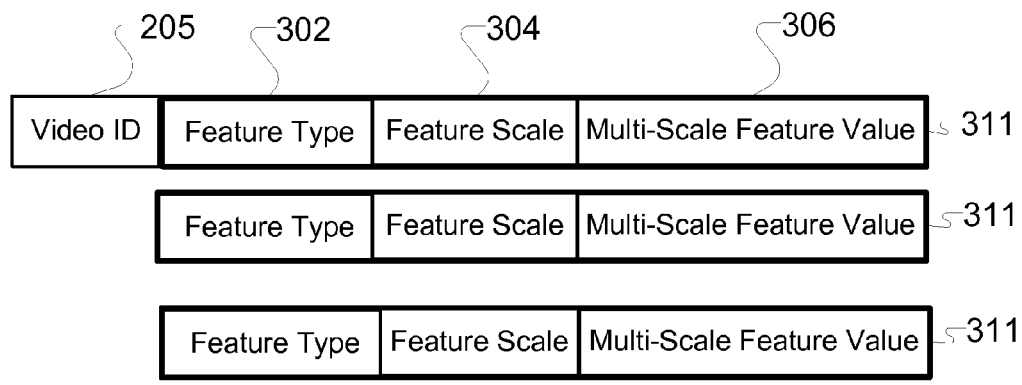
FIG. 3a illustrates the storage of Multi-Scale Feature Data 311 generated from video data in the Video Database 111 according to one embodiment.

FIG. 3a illustrates the storage of Multi-scale Features 311 in a Video Database 111 according to one embodiment. Each video is represented using a Video ID 205 and stored with a series of Multi-Scale Feature 311 represented as tuples. Multi-Scale Features 311 are generated from the Time Series Features 211. Here, a tuple consists of a Feature Type 302, Feature Scale 304, and a set of Multi-Scale Feature Values 306. In some embodiments, each Multi-Scale Feature 311 will reference the set of Time Series Features 211 used to generate the Multi-Scale Feature 311.

The Feature Type 302 of the Multi-Scale Feature 311 indicates the type of feature that is extracted in Multi-Scale Feature generation. Suitable Feature Types 302 include duration, average duration, average feature value, maximum and minimum feature values, derivative based values, rank, percentile values, statistical measures, and any combination thereof. Feature Type 302 may be represented by any kind of unique value for each Feature Type 302, such as a string or an integer. Other values will be apparent to those skilled in the art. The Multi-Scale Feature Value 306 is the field used to store the value of the Multi-Scale Feature corresponding to the Feature Type 302 and the Feature Scale 304.

The Feature Scale 304 refers to a scale used to generate the Multi-Scale Feature 311. According to the embodiment, the Feature Scale 304 may represent either a time scale or a threshold. The Feature Scale 304 may be denoted using numerical variables or categorical variables or any combination thereof.

Figure 3B:
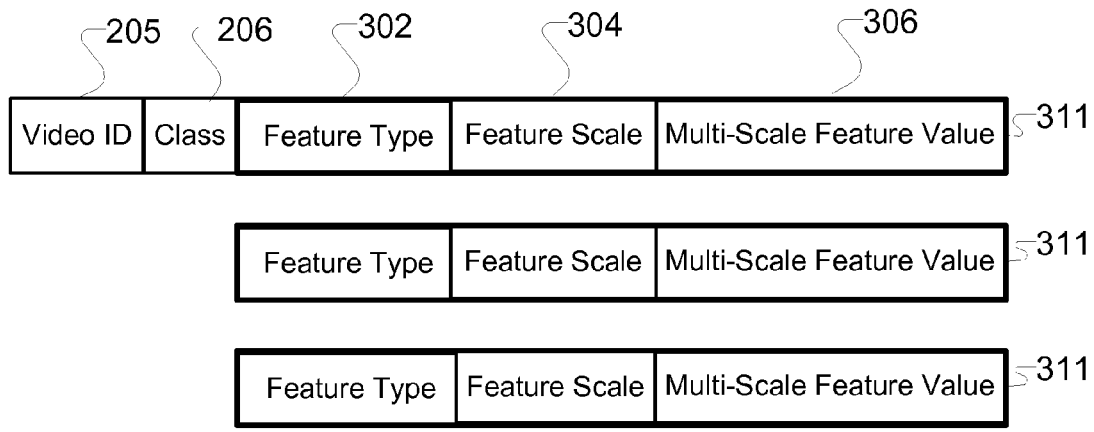
FIG. 3b illustrates the storage of Multi-Scale Feature Data 311 generated from labeled video data in a Video Corpus Database 121 according to one embodiment.

FIG. 3b illustrates the storage of Multi-Scale Features 311 in the Video Corpus Database 121 according to one embodiment. Each Video is represented using a Video ID 205 and stored with a series of Multi-Scale Features 311 and the Class 206 associated with the Video.

Figure 4:
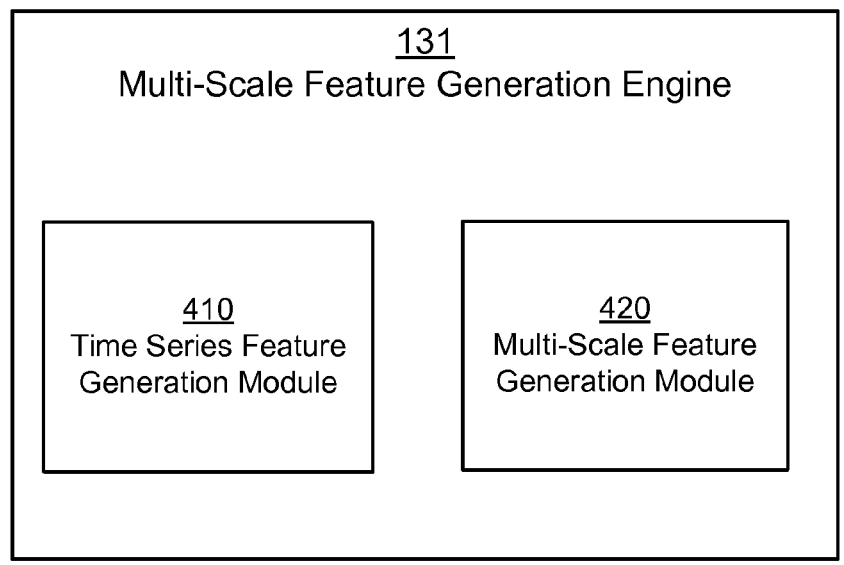
FIG. 4 illustrates one embodiment of a Multi-Scale Feature Generation Engine 131

FIG. 4 illustrates one embodiment of a Multi-Scale Feature Generation Engine 131. The Multi-Scale Feature Generation Engine 131 is comprised of two modules: a Time Series Feature Generation Module 410 and a Multi-Scale Feature Generation Module 420.

The Time Series Feature Generation Module 410 generates Time Series Features 211 for videos in the Video Database 111 and Video Corpus Database 121. The Time Series Feature Generation Module 410 calculates the Feature Value 209 of a Time Series Feature 211 at a specified set of Feature Time Points 208. The Time Series Feature Generation Module 410 further stores the Time Series Features 211 for the videos in the Video Database 111 and the Video Corpus Database 121. In most embodiments, the Time Series Feature Generation Module 410 is run as a batch program when videos are added to the Video Database 111 and Video Corpus Database 121.

The Multi-Scale Feature Generation Module 420 generates Multi-Scale Features 311 based on the Time Series Features 211 generated for a video. The Multi-Scale Feature Generation Module 420 generates sets of Feature Scales 304 based on the Time Series Features 211.

Figure 5:
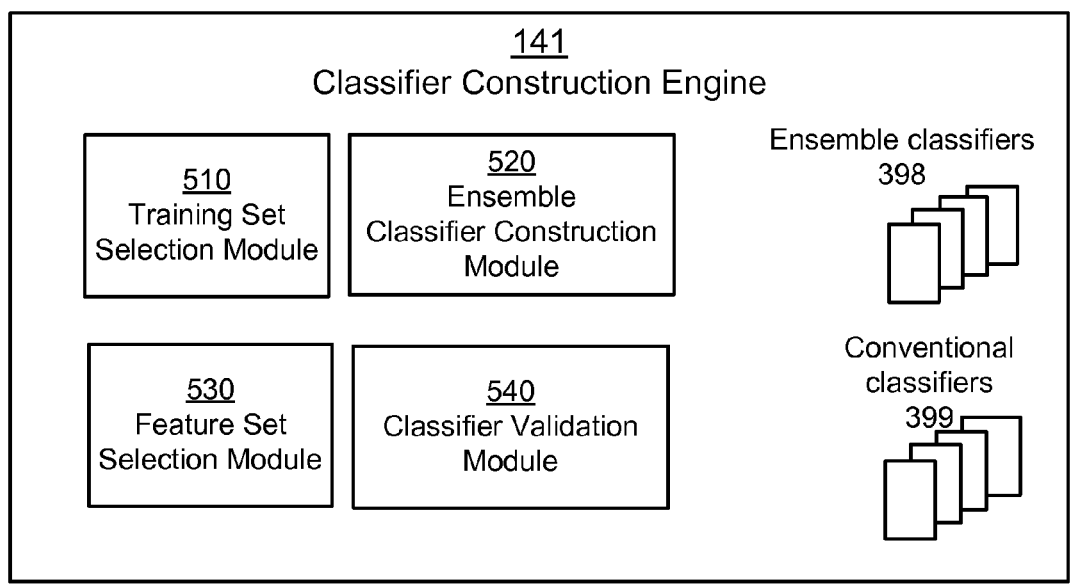
FIG. 5 illustrates one embodiment of a Classifier Construction Engine 141.

FIG. 5 illustrates one embodiment of a Classifier Construction Engine 141. The Classifier Construction Engine 141 is comprised of three modules, a Training Set Selection Module 510, a Feature Set Selection Module 530, an Ensemble Classifier Construction Module 520 and a Classifier Validation Module 540.

The Training Set Selection Module 510 selects subsets of videos associated with a Class 206 of videos as training data for classifier construction. The Training Set Selection Module 510 is adapted to receive Classes 206 of Videos as input. The Training Set Selection Module 510 is adapted to communicate with one or more Video Corpus Databases 121 to select training sets comprised of videos of the received Classes 259 of videos. The Training Set Selection Module 510 is also adapted to receive sets of features associated with videos from the Feature Set Selection Module 530. The Training Set Selection Module 510 uses graph based sampling to select sets of videos associated with a Class 206 of Videos as training data. Graph based sampling is described in detail in application Ser. No. 11/840,319, "Graph Based Sampling" filed on Aug. 16, 2007, the disclosure of which is incorporated herein by reference.

The Feature Set Selection Module 530 selects subsets of features associated with a selected set of videos for use as training data for classifier construction. The Feature Set Selection Module 530 is adapted to communicate with one or more Video Corpus Databases 121 to select subsets of features associated with a selected set of videos. The Feature Set Selection Module 530 receives a set of selected videos as input. Alternatively, the Feature Set Selection Module 530 is adapted to receive a selected set of videos from the Training Set Selection Module 510. The Feature Set Selection Module 530 selects subsets of features associated with the set of videos such as training data using graph based sampling.

The Ensemble Classifier Construction Module 520 generates Ensemble or consensus classifiers 398 based on selected training sets of time series data. Ensemble or consensus classifiers refer to computer-implemented classification models which generate a plurality of statistical classification models and combine the predictions of the plurality of statistical classification models. The Ensemble Classifier Construction Module 520 generates Ensemble classifiers 398 according to any consensus classification algorithm including Boosting and Bagging algorithms. Other applications of consensus classification using other classifier algorithms will be apparent to those skilled in the art. The Ensemble classifiers 398 are stored as computer readable files.

The Classifier Validation Module 540 generates conventional or single classifiers 399 based on a conventional or single classification model or algorithm as opposed to Ensemble methods. According to one embodiment, the Classifier Validation Module 540 generates a conventional classifier 399 based on a single training set of time series data. In other embodiments, the Classifier Validation Module 540 generates a plurality of conventional classifiers 399 based on a plurality of training sets to validate the classification model or algorithm. The conventional classifiers 399 are typically stored as computer readable files.

In one embodiment, the Classifier Validation Module 540 is adapted to receive sets of training data from the Training Set Selection Module 510. The Classifier Validation Module 540 generates a plurality of classifiers using any probabilistic or regression based classification algorithm including support vector machines (SVMs), neural networks, and Bayesian approaches. Other classification algorithms will be apparent to those skilled in the art. According to the embodiment, the Classifier Validation Module 540 generates multi-class classifiers or binary classifiers.

The Classifier Validation Module 540 further generates scores representative of the accuracy of the classification model by determining a plurality of accuracy values. The Classifier Validation Module 540 is adapted to receive test sets of video data associated with classes of Videos from the Video Corpus Database 121. The Classifier Validation Module 540 generates accuracy scores based on the classification results generated from the application of classifiers to test sets of time series data. Test time series data sets are data sets with known classes of time series data used to evaluate the accuracy of classifier prediction. The classifiers are applied to the test time series data sets to generate metrics or classification results. Classification results include the number of false positive classifications of test set time series data, the number of false negative classifications of test set data, the percentage or accurate classifications or any other quantitative classification result representative of the accuracy of the classifier.

Figure 6:
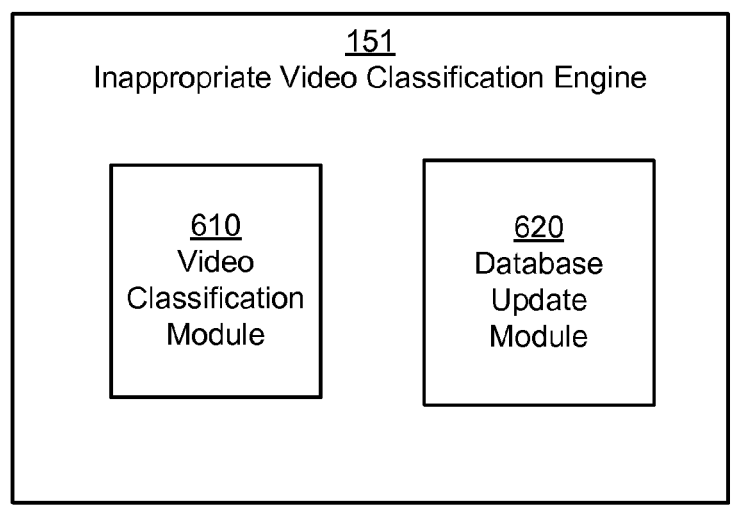
FIG. 6 illustrates one embodiment of an Inappropriate Video Classification Engine 151.

FIG. 6 illustrates one embodiment of an Inappropriate Video Classification Engine 151. The Inappropriate Video Classification Engine 151 is comprised of two modules, a Video Classification Module 610 and a Database Update Module 620. The Inappropriate Video Classification Engine 151 is adapted to communicate with the Video Database 111 and the Video Corpus Database 121. The Video Classification Module 610 is further adapted to receive classifiers from the Classifier Construction Engine 141.

The Video Classification Module 610 operates to classify videos. The Video Classification Module 610 identifies videos in the Video Databases 111 for classification. In some embodiments, the type of classifiers 398, 399 and videos to be classified by the Video Classification Module 610 are specified based on user input.

The Video Classification Module 610 generates classification values for series events by applying a classifier to the videos. Classification values may be absolute values or probability values. In some embodiments, the Video Classification Module 610 assigns a Class 206 to videos based on the classification value exceeding a threshold value.

The Database Update Module 620 operates to update the Video Corpus Database 121 based on the Class 206 assigned to videos. In some embodiments, the Database Update Module 620 operates to updates the video Corpus Databases 121 to add the videos with newly assigned Classes 206.

Figure 7:
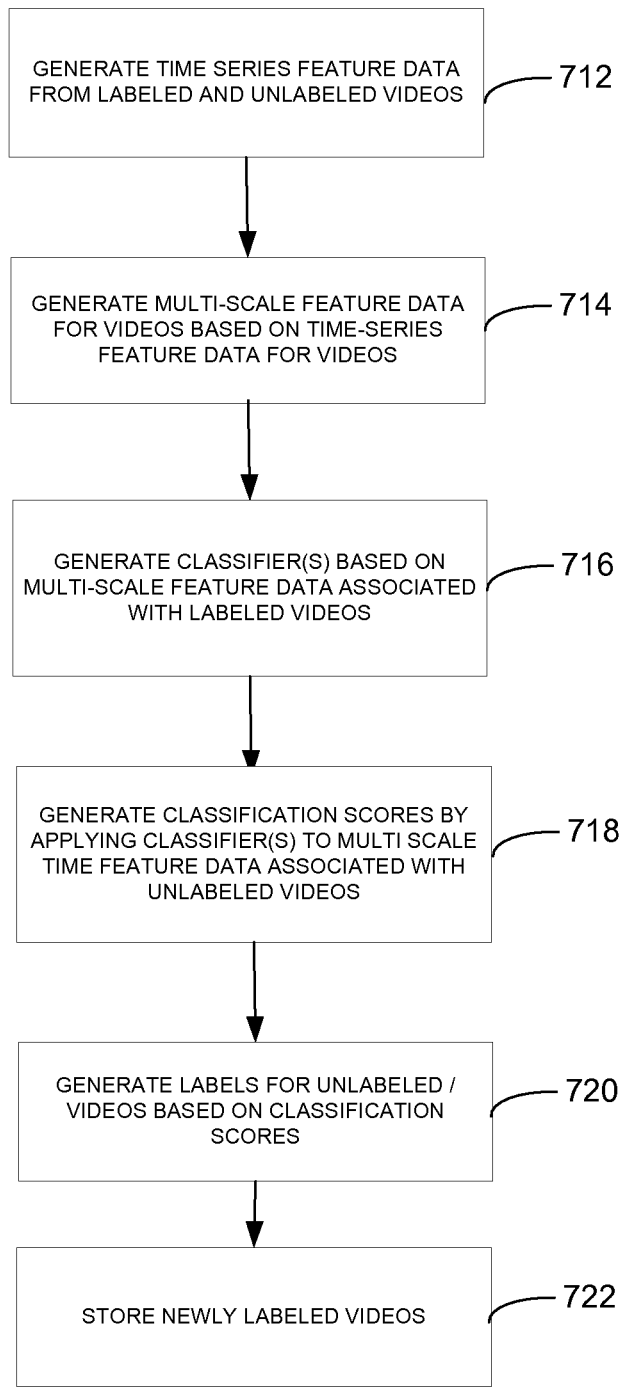
FIG. 7 illustrates a high level workflow for inappropriate video classification according to one embodiment.

FIG. 7 is flowchart illustrating a more detailed view of steps performed in classifying inappropriate videos according to one embodiment. The Time Series Feature Generation Module 410 generates 712 a set of Time Series Features 211 for each of the labeled and unlabelled Videos. The Time Series Feature Generation Module 410 stores the Time Series Features 211 generated for unlabeled and labeled videos in the Video Database 111 and the Video Corpus Database 121, respectively. Feature Values 209 are generated based on each Times Series Feature 211. The Time Series Features 211 can include features based on any type of audio information as pitch, volume, tone and MFCC coefficients. The Time Series Features 211 can further include features obtained from motion model algorithms, features obtained using optical text recognition algorithms, image features such as color histograms, features generated using edge detection algorithms, features generated using shot detection algorithms and features derived from speech to text processing algorithms. The Time Series Features 211 can further include features generated using human anatomy recognition algorithms such as face recognition algorithms, skin recognition algorithms and limb recognition algorithms.

According to the embodiment, the Time Series Feature Generation Module 410 can generate 712 Time Series Features 211 at a set of Feature Time Points 208 which represent a continuous sampling of the Video or a sampling from defined intervals throughout the Video. The defined intervals can represent any time interval but typically will range from a millisecond to a several seconds.

The Multi-Scale Feature Generation Module 420 generates 714 a set of Multi-Scale Features 311 based on the set of Time Series Features 211. The Multi-Scale Feature Generation Module 420 can generate a multi-scale model using any type of transformation of the Time Series Features 211 which divides or transforms a set of Time Series Features 211 representing Feature Values 209 for a given Feature Name 207 into several different Feature Scales 304 over time and/or space. The Multi-Scale Features 311 are generated 714 as discussed below with respect to FIGS. 8-11.

The Classifier Construction Engine 141 generates 716 one or more inappropriate video classifiers based on the Multi Scale Features 311 and the Time Series Features 211 generated for Videos associated with a class 206 of videos that indicates inappropriate content. The Training Set Selection Module 510 selects Videos associated with Classes 206 that indicate inappropriate content such as adult content, hate content and violent content. In a specific embodiment, the Training Set Selection Module 510 uses graph based sampling to select a subset of the Videos associated with a Class 206. In some embodiments, the Feature Set Selection Module 530 uses graph based sampling to select a subset of the Multi Scale Features 311 and the Time Series Features 211 generated for Videos associated with a Class 206 that indicates inappropriate content.

The Classifier Construction Engine 141 either generates 716 Ensemble classifiers 398 or Conventional Classifiers 399 based on the selected features and selected Videos labeled with one or more Classes 206 that indicate inappropriate content as described above. In generating both Ensemble classifiers 398 and Conventional Classifiers 399, the Classifier Construction Engine 141 identifies Multi-Scale Features 311 that have a high discriminative value in identifying the Class 206 of a Video. For Videos in which a subset of time or space points in the time series the event upon which the Class 206 will be based, the discriminative value of a Multi-Scale Feature 311 corresponds to the Feature Type 302 or Feature Scales 304 of the Multi-Scale Feature 311. Suitable methods of generating and evaluating Ensemble classifiers 398 and Conventional Classifiers 399 are discussed in detail in the above referenced application "Graph Based Sampling".

The Video Classification Module 610 determines labels for Videos stored in the Video Database 111. The Video Classification Module 610 selects a set of unlabelled Videos from the Video Database 111 for classification. The Video Classification Module 610 applies an Ensemble classifier 398 or Conventional Classifier to the Time Series Features 211 and Multi-Scale Features 311 associated with the unlabelled Video data to generate classification score(s) which indicate the likelihood that an unlabelled Video is of one or more Classes 206 which indicate that the video has inappropriate content. The Video Classification Module 610 determines that a Video is to be labeled with a Class 206 based on the classification score exceeding a specified likelihood value. For example, the Time Series Classification Module may determine a Video is of a class 206 which indicates inappropriate content based on a values indicating a likelihood that a Video is of a specified Class 206 of 95% or greater.

The Database Update Module 620 stores the newly labeled Video data in the Video Corpus Database 121. The Database Update Module 620 stores the Time Series Features 211 and the Multi-scale Features 311 for the videos in association with the newly determined Class 206 of the video.

Figure 8A:
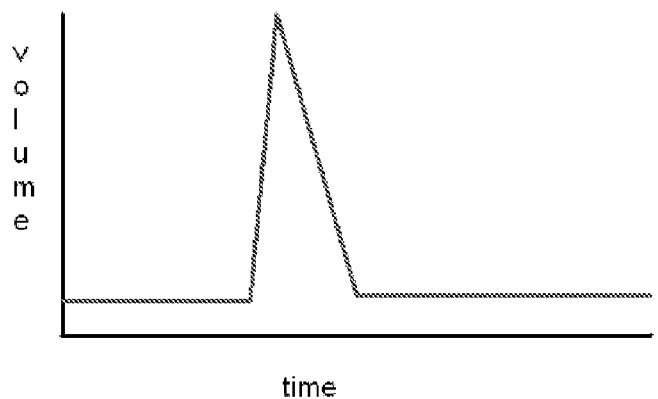
FIG. 8a illustrates a plot of feature values for a feature associated with a video according to one embodiment.

FIG. 8a provides an illustration of a simple time series feature for a video. In this illustration, the feature "volume" is plotted over a series of time points in the video. When plotted over time, the volume is shown to have a sharp localized increase, a characteristic that may provide discriminative value for the video. For instance, silence followed by a short interval with a sharp increase and decrease in volume could be specific to a genre of music or type of video. As this increase in volume is localized to a set time points within the time-series event, the average volume level over an entire duration of the video would not provide discriminative value in constructing a classifier. Also illustrated are several threshold values associated with different volume levels. A small number of contiguous time points have a volume level above threshold 1, a larger number of contiguous time points have a volume level above threshold 2 and a large number of contiguous time points have a volume level above threshold 3.

Figure 8B:
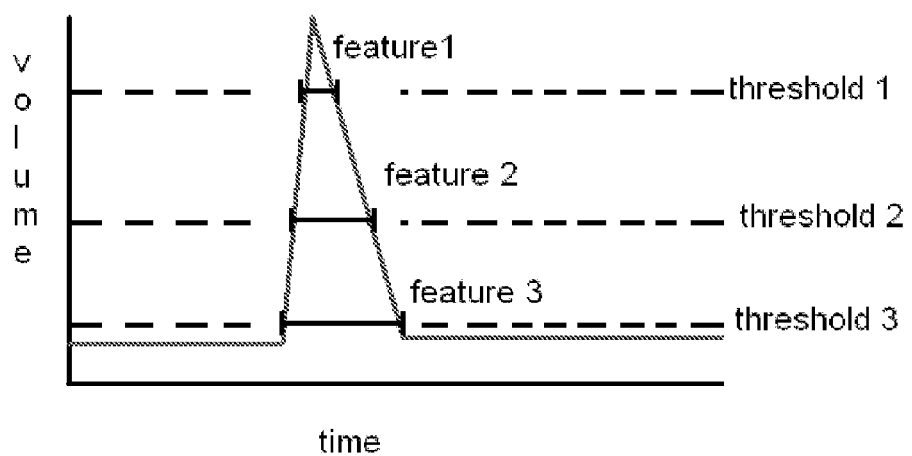
FIG. 8b illustrates the use of thresholds to identify corresponding time intervals at multiple scales of the time series feature associated with a video according to one embodiment.

FIG. 8b illustrates the use of multiple thresholds to generate multi-scale time series features. Time intervals comprising a set of time points where the time-series feature is at or above each threshold are identified. Time interval 1 is identified in association with threshold 1, time interval 2 is identified in association with threshold 2 and time interval 3 is identified in association with threshold 3. Through identifying the time intervals associated with different thresholds, characteristics which may have discriminative value are captured at different time or space scales corresponding to the thresholds specified. In FIG. 8b the time intervals identified characterize the localized increase of the time-series feature.

Figure 9:
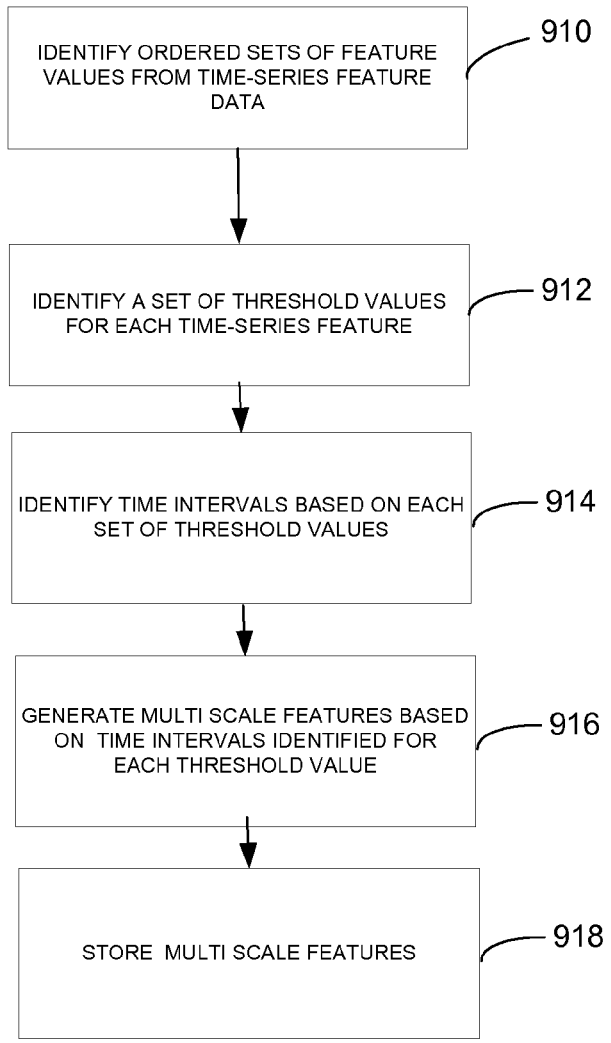
FIG. 9 illustrates a high level workflow for multi-scale feature generation according to one embodiment.

FIG. 9 is flowchart illustrating a more detailed view of steps performed in generating Multi-Scale Features 311 based on Time Series Features 211.

The Multi-Scale Feature Generation Module 420 identifies 910 a set of Time Series Features 211 of the same Feature Name 207 associated with a video represented using a Video ID 205. The Multi-Scale Feature Generation Module 420 represents the Time Series Features 211 as an ordered set of values, wherein the order of the Feature Values 209 reflects the temporal or spatial order of the Feature Time Points 208.

The Multi-Scale Feature Generation Module 420 identifies 912 a set of Feature Scale 304 values for each Time Series Feature 211. The set of Feature Scale 304 values may be based on a defined set of threshold values for each Time Series Feature 211. The defined set of threshold values may be absolute values defined for Time Series Features 211 associated with a specific Feature Name 207. Alternatively, the set of threshold values may be based on percentile values (e.g. $10^{th}$ percentile, $20^{th}$ percentile, $50^{th}$ percentile, $95^{th}$ percentile) generated based on all Feature Values 209 associated with the Time Series Features 211. Percentile values may also be generated based on all Feature Values 209 associated with all Time Series Features 211 in the Video Database 111 and/or Video Corpus Database 121 associated with a Feature Name 207.

The Multi-Scale Feature Generation Module 420 identifies 914 one or more time intervals associated with each threshold value. In some embodiments, the Multi-Scale Feature Generation Module 420 identifies 914 only the longest time interval of continuous Feature Time Points 208 where each Feature Value 209 associated with the Feature Time Point 208 is above or below the threshold value. In other embodiments, the Multi-Scale Feature Generation Module identifies 914 all intervals of continuous Feature Time Points 208 where each Feature Value 209 associated with the Feature Time Point 208 is above or below the threshold value.

The Multi-Scale Feature Generation Module 420 generates 916 Multi-Scale Features 311 based on the identified time intervals corresponding to each Feature Threshold 304. Depending on the embodiment, the Multi-Scale Feature Generation Module 420 can generate 916 Multi-Scale Feature Values 306 based on a single time interval identified in association with a Feature Scale 304 or multiple time intervals identified in association with a Feature Scale 304. In different embodiments, different Multi-Scale Feature Values 306 can be generated for different Feature Types 302. Feature Types 302 can include: the maximum and minimum Feature Values 208 for a single or multiple time intervals, the duration of the longest time interval of the time intervals, the average or standard deviation Feature Values 209 of the single or multiple time intervals, or any derivate of the Feature Values 209 of the single or multiple time intervals. Other Feature Types 302 will be apparent to those skilled in the art.

The Multi-Scale Feature Generation Module 420 stores 918 each Multi-Scale Feature Values 306 in association with its Feature Type 302 and Feature Scale 304 as a Multi-Scale Feature 311 in the Video Database 111 or Video Corpus Database 121.

Figure 10A:
FIG. 10a illustrates space components organized in a hierarchical scale structure, according to one embodiment.
Figure 10B:
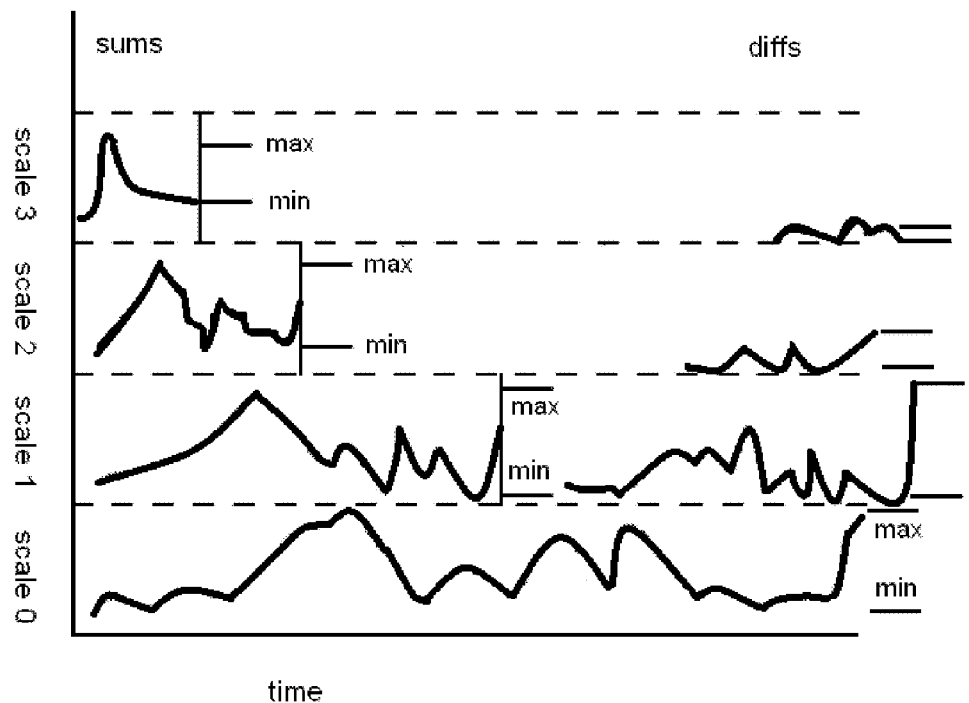
FIG. 10b illustrates a scale space decomposition generated using a wavelet transformation of time series event data, according to one embodiment.

FIG. 10b illustrates a scale space decomposition generated using a wavelet transformation of time series event data. A wavelet is a mathematical function used to divide a data set into different space components and study each space component with a resolution that matches its scale. A space component is a subpart of the time series. A moment is a type of space component derived from a function. Wavelet transformations divide time series data into moments called wavelets. Wavelets are scaled and translated copies (known as "daughter wavelets") of the time series data (known as the "mother wavelet").

In FIG. 10b, a wavelet transformation is used to decompose a signal corresponding to video data into four different scales: scale 0, scale 1, scale 2 and scale 3. Wavelets at the different scales are assigned values representing features of the wavelet to generate Multi-Scale Features 311. In this illustration, the Multi-Scale Features 311 representing the wavelets are the maximum and minimum values of the wavelets at each scale (labeled max and min). Multi-Scale Features 311 are not limited to maximum and minimum values but can be any value derived from the wavelets at each scale in the scale space decomposition.

Figure 11:
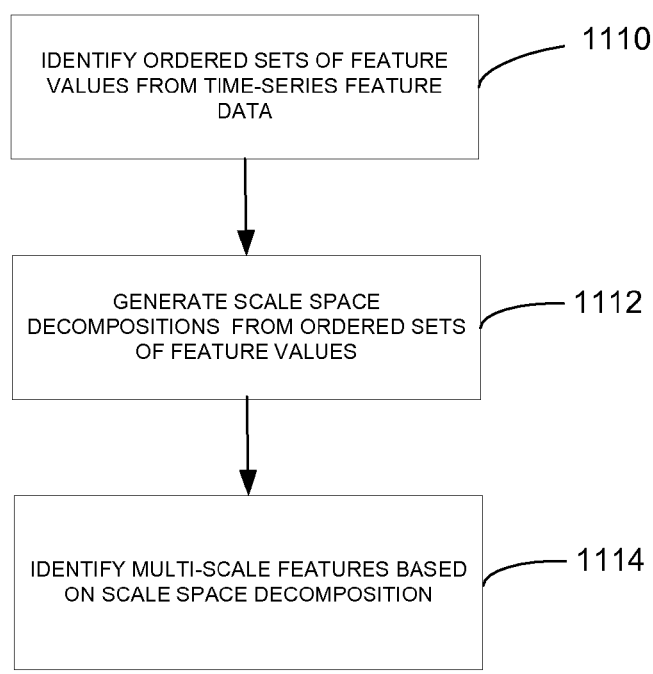
FIG. 11 is flowchart illustrating a more detailed view of steps performed in generating Multi-Scale Features 311 based on a scale space decomposition of Time Series Features 211.

FIG. 11 is flowchart illustrating a more detailed view of steps performed in generating Multi-Scale Features 311 based on a scale space decomposition of Time Series Features 211.

The Multi-Scale Feature Generation Module 420 identifies 1110 a set of Time Series Features 211 of the same Feature Name 207 associated with video represented using an Video ID 205. The Multi-Scale Feature Generation Module 420 represents the Time Series Features 211 as an ordered set of values, wherein the order of the Feature Values 209 reflects the temporal or spatial order of the Feature Time Points 208.

The Multi-Scale Feature Generation Module 420 generates 1112 a scale space decomposition from the ordered Feature Values 209 of the Time Series Features 211. The Multi-Scale Feature Generation Module 420 uses a transformation to divide up data, functions, or operators into a scale space decomposition which includes multiple scales. For scale space decompositions of time series data, these multiple scales will represent multiple time scales, but for other types of data the multiple scales may represent other dimensional information such as multiple scales of two or three dimensional space. The scale space decomposition is comprised of a set of different space components, where each space component describes features value information at a resolution matched to its scale. Depending on the type of transform the space components may have a hierarchical scale structure or any other order where the relationship between multiple scales is specified.

The relationships between scales in the scale space decomposition and the type of space components may vary according to type of transformation used to generate the scale space decomposition. For instance, using wavelet based transformations, each space component will correspond to a wavelet and will be organized in a hierarchical scale structure as shown in FIG. 10a. Suitable transformations scale space decompositions include the Short Time Fourier transformation (STFT) and wavelet based transformations such as Haar Decomposition, the Schauder decomposition and the Daubechies transformation. Other suitable multi-scale decompositions will be well known to those skilled in the art.

The Multi-Scale Feature Generation Module 420 identifies 1114 Multi-Scale Features 311 for each frequency component in the scale space decomposition. The Multi-Scale Feature Generation Module 420 determines Multi-Scale Features 306 include Multi-Scale Feature Values 306 for Feature Types 302 including but not limited to the average value of the frequency component, maximum value of the frequency component, minimum value of the frequency component, percentile value of the frequency component, derivative values from the frequency component, statistical measures, and values representing any combination thereof. Multi-Scale Features 311 are stored in the Video Database 111 and Video Corpus Database 121. The Classifier Construction Engine 141 uses Multi-Scale Features 311 associated with labeled time series events in the Video Corpus Database 121 to generate classifiers 398, 399. The Classifier Construction Engine 141 uses Multi-Scale Features 311 associated with unlabeled time series events in the Video Corpus Database 121 to generate classifiers.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of determining that a video contains inappropriate content, the method comprising:

identifying a set of time-series features associated with a video;

generating a scale space decomposition from the set of time-series features, the scale space decomposition being associated with a plurality of scales and comprising a plurality of space components corresponding to the scales;

determining a set of multi-scale features associated with the video based on the scales in the generated scale space decomposition, wherein each of a plurality of the multi-scale features is associated with a scale of the plurality of the scales, with one or more of the space components corresponding to the scale, and with a spatial or temporal portion of the video corresponding to a threshold of the time-series features at the scale, and wherein at least some of the multi-scale features are associated with a spatial or temporal portion of the video containing inappropriate content; and determining that the video contains inappropriate content based on the set of multi-scale features.

2. The method of claim 1, wherein the set of time-series features includes information derived from motion models applied to information associated with the video.

3. The method of claim 1, wherein the set of time-series features includes information derived from optical text recognition applied to information associated with the video.

4. The method of claim 1, wherein the set of time-series features includes information derived from human anatomy recognition algorithms applied to information associated with the video.

5. The method of claim 4, wherein the set of time-series features includes information derived from face recognition algorithms applied to information associated with the video.

6. The method of claim 1, wherein the set of time-series features includes information derived from edge detection algorithms applied to information associated with the video.

7. The method of claim 1, wherein the set of time-series features includes information derived from shot detection algorithms applied to information associated with the video.

8. The method of claim 1, wherein the set of time-series features includes information derived from speech to text processing algorithms applied to information associated with the video.

9. The method of claim 1, wherein determining that the video contains inappropriate content further comprises:
generating a statistical classification model; and
determining that the video contains inappropriate content based on the set of multi-scale features responsive to applying the statistical classification model to the set of multi-scale features associated with the video.

10. The method of claim 9, wherein generating a statistical classification model comprises:
identifying a set of time-series features associated with a set of videos that contain inappropriate content and a set of time-series features associated with a set of videos that do not contain inappropriate content;
determining a set of multi-scale features associated the sets of videos based on the sets of time series features; and
generating the statistical classification model based on the set of multi-scale features.

11. The computer-implemented method of claim 1, wherein each multi-scale feature is associated with a spatial portion of the video and a temporal portion of the video.

12. The computer-implemented method of claim 1, wherein the plurality of scales is based on a set of threshold values for the time-series features.

13. The computer-implemented method of claim 12, further comprising identifying one or more time intervals associated with each of the threshold values.

14. The computer-implemented method of claim 1, wherein each multi-scale feature is associated with a scale representing a spatial or temporal portion of the video.

15. The computer-implemented method of claim 1, wherein at least some of the multi-scale features comprise an average value of frequency components of the scale space decompositions.

16. The computer-implemented method of claim 1, wherein at least some of the multi-scale features comprise a maximum value of frequency components of the scale space decompositions.

17. The computer-implemented method of claim 1, wherein at least some of the multi-scale features comprise a minimum value of frequency components of the scale space decompositions.

18. The computer-implemented method of claim 1, wherein at least some of the multi-scale features comprise a percentile value of frequency components of the scale space decompositions.

19. A computer system for determining that a video contains inappropriate content, the system comprising:
a computer processor; and
a non-transitory computer readable storage medium storing modules encoded with executable program code, the modules comprising:
a time-series feature generation module adapted to identify a set of time-series features associated with a video;
a multi-scale feature generation module adapted to:
generate a scale space decomposition from the set of time-series features, the scale space decomposition being associated with a plurality of scales and comprising a plurality of space components corresponding to the scales;
determine a set of multi-scale features associated with the video based on the scales in the generated scale space decomposition, wherein each of a plurality of the multi-scale features is associated with a scale of the plurality of the scales, with one or more of the space components corresponding to the scale, and with a spatial or temporal portion of the video corresponding to a threshold of the time-series features at the scale, and wherein at least some of the multi-scale features are associated with a spatial or temporal portion of the video containing inappropriate content; and
an inappropriate video classification module adapted to determine that the video contains inappropriate content based on the set of multi-scale features.

20. The system of claim 19, wherein the set of time-series features includes information derived from motion models applied to information associated with the video.

21. The system of claim 19, wherein the set of time-series features includes information derived from optical text recognition applied to information associated with the video.

22. The system of claim 19, wherein the set of time-series features includes information derived from human anatomy recognition algorithms applied to information associated with the video.

23. The system of claim 22, wherein the set of time-series features includes information derived from face recognition algorithms applied to information associated with the video.

24. The system of claim 19, wherein the set of time-series features includes information derived from edge detection algorithms applied to information associated with the video.

25. The system of claim 19, wherein the set of time-series features includes information derived from shot detection algorithms applied to information associated with the video.

26. The system of claim 19, wherein the set of time-series features includes information derived from speech to text processing algorithms applied to information associated with the video.

27. The system of claim 19, further comprising:
a classifier construction engine adapted to generate a statistical classification model; and
the video classification module is further adapted to determine that the video contains inappropriate content based on the set of multi-scale features responsive to applying the statistical classification model to the set of multi-scale features associated with the video.

28. The system of claim 27, wherein:
the time-series feature generation module is further adapted to identify a set of time-series features associated with a set of videos that contain inappropriate content and a set of time-series features associated with a set of videos that do not contain inappropriate content;
the multi-scale feature generation module is further adapted to determine a set of multi-scale features associated the sets of videos based on the sets of time series features; and
the classifier construction module is further adapted to generate the statistical classification model based on the set of multi-scale features.

29. A non-transitory computer-readable storage medium encoded with executable program code for determining that a video contains inappropriate content, the program code comprising program code for:
identifying a set of time-series features associated with a video;
generating scale space decomposition from the set of time-series features, the scale space decomposition being associated with a plurality of scales and comprising a plurality of space components corresponding to the scales;
determining a set of multi-scale features associated with the video based on the scales in the generated scale space decomposition, wherein each of a plurality of the multi-scale features is associated with a scale of the plurality of scales, with one or more of the space components corresponding to the scale, and with a spatial or temporal portion of the video corresponding to a threshold of the time series features at the scale, and wherein at least some of the multi-scale features are associated with a spatial or temporal portion of the video containing inappropriate content; and
determining that the video contains inappropriate content based on the set of multi-scale features.

30. The computer-readable storage medium of claim 29, wherein the set of time-series features includes information derived from motion models applied to information associated with the video.

31. The computer-readable storage medium of claim 29, wherein the set of time-series features includes information derived from optical text recognition applied to information associated with the video.

32. The computer-readable storage medium of claim 29, wherein the set of time-series features includes information derived from human anatomy recognition algorithms applied to information associated with the video.

33. The computer-readable storage medium of claim 32, wherein the set of time-series features includes information derived from face recognition algorithms applied to information associated with the video.

34. The computer-readable storage medium of claim 29, wherein the set of time-series features includes information derived from edge detection algorithms applied to information associated with the video.

35. The computer-readable storage medium of claim 29, wherein the set of time-series features includes information derived from shot detection algorithms applied to information associated with the video.

36. The computer-readable storage medium of claim 29, wherein the set of time-series features includes information derived from speech to text processing algorithms applied to information associated with the video.

37. The computer-readable storage medium of claim 29, wherein program code for determining that the video contains inappropriate content further comprises program code for:
generating a statistical classification model; and
determining that the video contains inappropriate content based on the set of multi-scale features responsive to applying the statistical classification model to the set of multi-scale features associated with the video.

38. The computer-readable storage medium of claim 37, wherein program code for generating a statistical classification model comprises program code for:
identifying a set of time-series features associated with a set of videos that contain inappropriate content and a set of time-series features associated with a set of videos that do not contain inappropriate content;
determining a set of multi-scale features associated the sets of videos based on the sets of time series features; and
generating the statistical classification model based on the set of multi-scale features.

39. A computer-implemented method of determining that a video is associated with a class of videos, the method comprising:
identifying a set of time-series features associated with a video;
generating scale space decomposition from the set of time-series features, the scale space decomposition being associated with a plurality of scales and comprising a plurality of space components corresponding to the scales;
determining a set of multi-scale features associated with the video based on the scales in the generated scale space decomposition, wherein each of a plurality of the multi-scale features is associated with a scale of the plurality of the scales, with one or more of the space components corresponding to the scale, and with a spatial or temporal portion of the video corresponding to a threshold of the time-series features at the scale, and wherein at least some of the multi-scale features are associated with a spatial or temporal portion of the video associated with the class of videos; and
determining that the video is associated with the class of videos based on the set of multi-scale features.

40. The method of claim 39, wherein the set of time-series features includes information derived from motion models applied to information associated with the video.

41. The method of claim 39, wherein the set of time-series features includes information derived from optical text recognition applied to information associated with the video.

42. The method of claim 39, wherein the set of time-series features includes information derived from human anatomy recognition algorithms applied to information associated with the video.

43. The method of claim 42, wherein the set of time-series features includes information derived from face recognition algorithms applied to information associated with the video.

44. The method of claim 39, wherein the set of time-series features include information derived from edge detection algorithms applied to information associated with the video.

45. The method of claim 39, wherein the set of time-series features includes information derived from shot detection algorithms applied to information associated with the video.

46. The method of claim 39, wherein the set of time-series features includes information derived from speech to text processing algorithms applied to information associated with the video.

47. The method of claim 39, wherein determining that the video is associated with a class of videos further comprises:
generating a statistical classification model; and
determining that the video is associated with the class of videos based on the set of multi-scale features responsive to applying the statistical classification model to the set of multi-scale features associated with the video.

48. The method of claim 47, wherein generating a statistical classification model comprises:
identifying a set of time-series features associated with a set of videos associated with the class of videos and a set of time-series features associated with a set of videos that are not associated with the class of videos;
determining a set of multi-scale features associated the sets of videos based on the sets of time series features; and
generating the statistical classification model based on the set of multi-scale features.

49. A computer system for determining that a video is associated with a class of videos, the system comprising:
a computer processor; and
a non-transitory computer readable storage medium storing modules encoded with executable program code, the modules comprising:
a time-series feature generation module adapted to identify a set of time-series features associated with a video;
a multi-scale feature generation module adapted to:
generate a scale space decomposition from the set of time-series features, the scale space
decomposition being associated with a plurality of scales and comprising a plurality of space components corresponding to the scales;
determine a set of multi-scale features associated with the video based on the scales in the generated scale space decomposition, wherein each of a plurality of the multi-scale features is associated with a scale of the plurality of the scales, with one or more of the space components corresponding to the scale, and with a spatial or temporal portion of the video corresponding to a threshold of the time-series features at the scale, and wherein at least some of the multi-scale features are associated with a spatial or temporal portion of the video associated with the class of videos; and
an inappropriate video classification module adapted to determine that the video is associated with the class of videos based on the set of multi-scale features.

50. The system of claim 49, wherein the set of time-series features includes information derived from motion models applied to information associated with the video.

51. The system of claim 49, wherein the set of time-series features includes information derived from optical text recognition applied to information associated with the video.

52. The system of claim 49, wherein the set of time-series features includes information derived from human anatomy recognition algorithms applied to information associated with the video.

53. The system of claim 52, wherein the set of time-series features includes information derived from face recognition algorithms applied to information associated with the video.

54. The system of claim 49, wherein the set of time-series features includes information derived from edge detection algorithms applied to information associated with the video.

55. The system of claim 49, wherein the set of time-series features includes information derived from shot detection algorithms applied to information associated with the video.

56. The system of claim 49, wherein the set of time-series features includes information derived from speech to text processing algorithms applied to information associated with the video.

57. The system of claim 49, further comprising:
a classifier construction engine adapted to generate a statistical classification model; and
the video classification module is further adapted to determine that the video is associated with the class of videos based on the set of multi-scale features responsive to applying the statistical classification model to the set of multi-scale features associated with the video.

58. The system of claim 57, wherein:
the time-series feature generation module is further adapted to identify a set of time-series features associated with a set of videos associated with the class of videos and a set of time-series features associated with a set of videos that are not associated with the class of videos;
the multi-scale feature generation module is further adapted to determine a set of multi-scale features associated the sets of videos based on the sets of time series features; and
the classifier construction module is further adapted to generate the statistical classification model based on the set of multi-scale features.

59. A non-transitory computer-readable storage medium encoded with executable program code for determining that a video is associated with a class of videos, the program code comprising program code for:
identifying a set of time-series features associated with a video; generating a scale space decomposition from the set of time-series features, the scale space decomposition being associated with a plurality of scales and comprising a plurality of space components corresponding to the scales;
determining a set of multi-scale features associated with the video based on the scales in the generated scale space decomposition, wherein each of a plurality of the multi-scale features is associated with a scale of the plurality of the scales, with one or more of the space components corresponding to the scale, and with a spatial or temporal portion of the video corresponding to a threshold of the time-series features at the scale, and wherein at least some of the multi-scale features are associated with a spatial or temporal portion of the video associated with the class of videos; and
determining that the video is associated with the class of videos based on the set of multi-scale features.

60. The computer-readable storage medium of claim 59, wherein the set of time-series features includes information derived from motion models applied to information associated with the video.

* * * * *

UNITED STATES PATENT AND TRADEMARK OFFICE
CERTIFICATE OF CORRECTION

PATENT NO. : 8,510,252 B1
APPLICATION NO. : 12/248780
DATED : August 13, 2013
INVENTOR(S) : Ullas Gargi and Jay Yagnik Page 1 of 1

It is certified that error appears in the above-identified patent and that said Letters Patent is hereby corrected as shown below:

In the Claims:

Column 15, Claim 10, lines 58 and 59; please replace "multi-scale features associated the sets of videos based on the sets of time series features" with -- multi-scale features associated with the sets of videos based on the sets of time-series features --;

Column 17, Claim 28, lines 26, 27 and 28; please replace "multi-scale features associated the sets of videos based on the sets of time series features" with -- multi-scale features associated with the sets of videos based on the sets of time-series features --;

Column 17, Claim 29, line 50; please replace "time series" with -- time-series --;

Column 18, Claim 38, lines 33 and 34; please replace "multi-scale features associated the sets of videos based on the sets of time series features" with -- multi-scale features associated with the sets of videos based on the sets of time-series features --;

Column 19, Claim 48, lines 31 and 32; please replace "multi-scale features associated the sets of videos based on the sets of time series features" with -- multi-scale features associated with the sets of videos based on the sets of time-series features --;

Column 20, Claim 58, lines 39, 40 and 41; please replace "multi-scale features associated the sets of videos based on the sets of time series features" with -- multi-scale features associated with the sets of videos based on the sets of time-series features --.

Signed and Sealed this
Third Day of June, 2014

Michelle K. Lee
*Deputy Director of the United States Patent and Trademark Office*